Nov. 17, 1925.
W. H. EDWARDS
TRAP NEST
Filed April 16, 1923
1,561,778
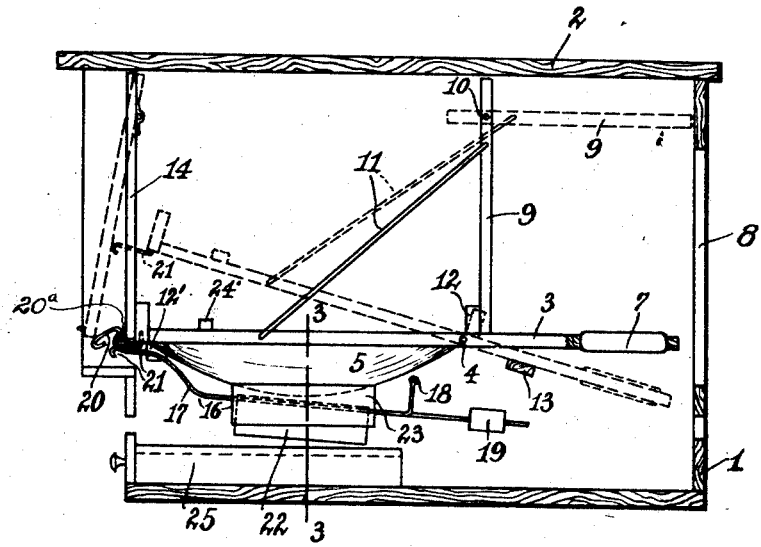
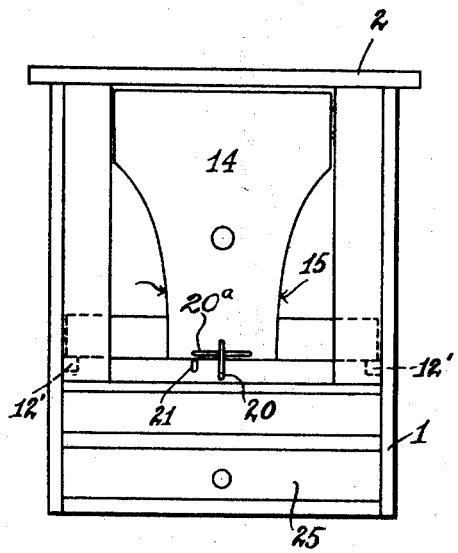
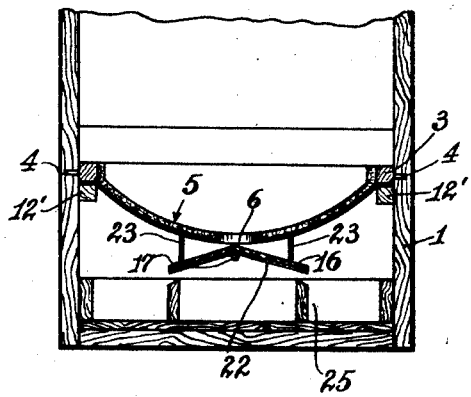
INVENTOR
WILLIAM H. EDWARDS
BY
Harry C. Schroeder
ATTORNEY Patented Nov. 17, 1925.

1,561,778

UNITED STATES PATENT OFFICE.

WILLIAM H. EDWARDS, OF BERKELEY, CALIFORNIA.

TRAP NEST.

Application filed April 16, 1923. Serial No. 632,216.

*To all whom it may concern:*

Be it known that I, WILLIAM H. EDWARDS, a citizen of the United States, residing at Berkeley, in the county of Alameda and State of California, have invented certain new and useful Improvements in Trap Nests, of which the following is a specification.

My invention is an improved trap nest. The object of my invention is to provide a trap nest which is simple in construction and effective in operation.

In the drawing in which my invention is illustrated:

Figure 1 is a longitudinal sectional view of my nest.

Figure 2 is an end view of the same.

Figure 3 is a sectional view taken on line 3—3 of Figure 1.

Referring more particularly to the drawing, the numeral 1 indicates a box and 2 the cover thereof. The nest frame 3 is pivoted at 4 to the side walls of the box 1. A concave nest 5 is formed on the rear portion of the frame 3 which has an opening 6 through the bottom thereof, through which the egg is adapted to fall. A counterweight 7 is secured to the frame 3 forwardly of the pivot 4, to normally hold the frame in the tilted position shown in dotted lines in Figure 1.

An opening 8 is provided in the front wall of the box 1 through which the hen enters the nest. A door 9 is pivoted at 10 to the side walls of the box 1 in front end thereof. A link 11 is pivoted to the door 9 below the pivot 10, and to the nest frame 3. The door 9 is adapted to rest against a stop cleat 12, in the vertical position, said cleat being secured to the frame 3. The frame 3 is held in its maximum tilted position by engaging a post 13 which is secured to the walls of the box 1. Blocks 12' are secured to the walls of the box 1 to limit the downward movement of the frame 3.

An exit door 14 is pivoted at the rear end of the box 1, the sides of said door being cut out as at 15 to admit light into the box, and induce the chicken to work herself out when the hook 20 is disengaged. The door 14 is held against opening by a trigger 16, which comprises a rod 17 pivoted at 18 to the box 1. A counter-weight 19 normally holds the trigger 16 in a raised position. The hook 20 on the rear end of the rod 17 is adapted to engage the lower edge of the door 14 and the projection 20ª thereon and hold it against opening. A pin 21 projects from the rear edge of the frame 3 under the bottom of the door 14 to prevent said frame from being tipped while a hen is setting on the nest. A plate 22 is secured to the rod 17 below the hole 6 in the nest 5, and a pair of guide plates 23 depend from the nest 5 at either side of the hole 6, and contact with the plate 22 when the hen is on the nest. A perch 24' is formed on the rear of the frame 3—the hen stands on this as she leaves the nest. An egg drawer 25 slides into the box 1 under the nest 5 to receive the eggs.

The method of operation of my nest is as follows: Starting with the frame 3 in the tilted position, as shown in dotted lines in Figure 1, with the counter-weight 7 holding the frame against the stop 13; the hen enters the opening 8 and walks to the nest 5 which causes the frame 3 to swing downwardly and swing the door 9 against the stop 12, which also prevents any further downward movement of the frame 3. The door 14 swings inwardly over the hook 20 and pin 21, which traps the hen in the nest. When the egg is laid, it falls through the opening 6 onto the plate 22 and depresses the trigger 16. This allows the hen to push the door 14 outwardly and leave the nest. When her weight is removed the frame 3 tips upwardly and the egg rolls off of the plate 22 into the box 25, and the trigger 16 is raised by the counter-weight 19.

Having described my invention I claim:

1. A trap nest comprising a box, said box having an opening in the front wall thereof, entrance and exit doors pivoted in the front and rear respectively of said box, a frame pivoted in said box, a nest on said frame, a link joining said frame and entrance door, and a counterweight on said frame whereby it is normally held in a tilted position and said entrance door is held in a raised position and means carried by said frame whereby the frame is held in a horizontal position until the exit door is opened.

2. A trap nest comprising a box, said box having an opening in the front wall thereof, a door pivoted in the front of said box, a frame pivoted in said box, a nest on said frame, means whereby said door is opened and closed by said frame, an exit door pivoted at the rear of said box, means on said frame engaging said exit door when closed to prevent said frame from tipping until the hen has left the nest, and a trigger below said exit door.

3. In a trap nest, a tilting nest, an exit door controlled by an egg-operated trigger, said trigger having a plate thereon and means to retain an egg on said plate to hold said trigger in released position until the hen leaves the nest and said nest tilts upwardly whereupon said egg is released.

In testimony whereof I affix my signature.

WILLIAM H. EDWARDS.